3,439,510
TREATMENT OF RED BLOOD CELLS

Oscar S. Gray, Fort Lauderdale, Fla., assignor to Gray Industries, Inc., Fort Lauderdale, Fla., a corporation of Delaware
No Drawing. Filed Dec. 1, 1967, Ser. No. 687,122
Int. Cl. A61m *1/03*
U.S. Cl. 62—78
14 Claims

ABSTRACT OF THE DISCLOSURE

Red blood cells are subjected to microwave energy while held in a confined zone which is surrounded by a circulating atmosphere of coolant gas under superatmospheric pressure to improve the morphological characteristics of the cells.

BACKGROUND OF THE INVENTION

Fresh, healthy red blood cells, when viewed under a microscope, are generally round in shape and have a smooth, uniform peripheral membrane.

Whole blood after collection from a donor, deteriorates upon standing prior to transfusion. Such blood stored in a blood bank must stand for varying periods of time before ultimate use. In many cases the deleterious changes that take place upon standing are manifested in the morphological characteristics of the red blood cells, the degree of such changes being dependent upon the nature of the particular blood itself, the quality of the technique used in obtaining it, the length of time it has been stored and the conditions under which it has been stored. Among the principal morphological changes that can take place is crenation in which the red blood cell develops a notched or scalloped appearance resembling a gear. Pleocytosis (irregularity in the shape and size of the red cells) can also occur. In an attempt to alleviate these morphological changes, anti-coagulants are incorporated in the blood, but this is only a temporary expedient, creating an artificial situation, and the blood can become unuseable in a very short time. Thus, fresh blood obtained directly from the donor is preferred for transfusion over stored blood. However, for practical reasons, stored blood, as in a blood bank, represents an important source of blood supply for transfusion.

Clearly, means to inhibit the deleterious morphological changes in stored blood or to reverse these changes and improve the nature of blood which has been stored, would be highly desirable.

It is the principal object of the present invention to provide a method for improving the morphological characteristics of red blood cells.

It is another object of the present invention to provide a method for inhibiting deleterious morphological changes in red blood cells upon storage.

It is a further object of the present invention to provide a method for improving the morphological condition of red blood cells which have already undergone deleterious morphological changes upon standing.

These and other objects will become apparent from a consideration of the following specification and claims.

SUMMARY OF THE INVENTION

The method of the present invention comprises subjecting red blood cells in a treating zone, while contained in a confined zone within said treating zone at least one wall of which confined zone is permeable to microwave energy, to microwave energy through a moving atmosphere of coolant gas under superatmospheric pressure, for at least ten seconds but short of the time where significant rupture of the cells occurs, said moving atmosphere being in direct contact with walls of said confined zone but out of direct contact with said red blood cells and being at a temperature below about 60° F. upon its admission to said treating zone. Preferably, the circulation of coolant gas is continued, after discontinuance of the passage of the microwave energy, for a period to cool the red blood cells to a temperature below that reached by them during treatment with the microwave energy.

In one embodiment of the method, the confined zone containing the red blood cells is a sealed package thereof, at least one wall of which is permeable to microwave energy, such as a glass or plastic bottle or a plastic pouch. In a further specific embodiment, the confined zone is a tubular pathway, having a wall permeable to microwave energy, such as a glass or plastic tube, through which the red blood cells may be flowed during treatment.

As is well known, microwave energy is the electromagnetic wave energy of a wave length falling in the microwave region of the electromagnetic spectrum. The Federal Communications Commission has presently set aside, for microwave processing, bands of microwave energy within the range of between about 400 and 20,000 megacycles per second with a wave length ranging from about 13 inches for the lower frequencies to about 0.7 inch for the highest frequencies; specifically: frequencies of about 890–940 with a wave length of about 13 inches; frequencies of about 2400–2500 with a wave length of about 4–5 inches, and frequencies of 17,850–18,000 with a wave length of about 0.7 inch. However, the presently preferred microwave energy for use according to the present invention is an intermediate range having a frequency from about 1000 to about 5000, more particularly from about 2000 to about 3000, megacycles per second. Microwave energy is generated from a suitable high frequency source, such as a magnetron.

The red blood cells treated in accordance with the present invention may be those of human blood or animal blood. It may be whole blood, fresh or stored, or concentrated red blood cells which have stood for various periods of time. It has been found that treatment of fresh red blood cells which have a healthy appearance, in accordance with the present invention, inhibits deleterious morphological changes therein upon standing. Even fresh blood may show poor morphology, so that the present process may be applied to fresh blood flowing from the donor to the receiver during a direct transfusion, or even from the donor back to the donor as in autotransfusion, to insure good morphological characteristics. It has also been found that treatment of stored red blood cells, which have already undergone morphological changes short of rupture, reverses the deleterious process causing the red blood cells again to assume a healthy appearance. The present process may be applied to whole blood to which an anticoagulant has been or will be added.

An essential feature of the present invention is holding the red blood cells being treated in a confined zone during the treatment. The walls of the confined zone may be conventional, substantially gas-impermeable packaging materials like glass, polymethylmethacrylate, polystyrene and polyethylene, as in bottles, flasks, tubes and pouches. Part of the package or container may be of material impermeable to microwave energy, like aluminum and steel, so long as the wall of the container facing the source of microwave energy is permeable thereto. The confined zone will be essentially gas tight.

The confined zone holding the red blood cells, whether it be a package or tubular pathway or the like, will be held in a larger chamber into which the microwave energy is directed to penetrate the microwave-permeable wall of the confined zone and permeate the red blood cells.

Another essential feature of the invention is the circulation of a coolant gas, under superatmospheric pressure, through the treating chamber and around walls of the confined zone holding the red blood cells. The coolant gas employed may be any substantially inert (non-reactive with the environment in the presence of microwave energy) gas existing as a gas at the temperatures employed, especially nitrogen or carbon dioxide. While gases like argon, helium, neon, krypton, zenon, ethylene oxide, and mixtures thereof, and the like, are equivalent, they are less desirable at present because of their cost.

The temperature of the coolant gas entering the treating zone should be below about 60° F., and preferably below about 55° F. While the temperature thereof may go as low as 0° F., there is no advantage in it going below about 20°, and at such lower temperatures there may be freezing problems if the red blood cells are left in the treating zone containing the cold gas for extended periods after the source of microwave energy has been turned off. A temperature for the incoming gas between about 30 and about 50° F. has been found to be particularly suitable. The coolant gas will become warmed during its travel through the treating zone, particularly from contact with the walls of the confined zone holding the red blood cells, and the warmed gas is removed from the treating zone making way for incoming coolant gas. When the gas is recirculated for reuse the temperature thereof must be reduced back to the desired temperature for admission to the treating zone.

The pressure of the coolant gas in the treating zone will, as stated, be above atmospheric. Since the principal function of the coolant gas is to keep the walls of the confined zone at a temperature well below that of the red blood cells being treated, forcing the coolant gas into the treating chamber and past the walls of the confined zone under pressure provides more efficient overall cooling without some area or areas of the walls becoming insufficiently cooled. Pressures as low as 0.5 p.s.i.g. has been used and pressure as high as 50 p.s.i.g. may be desirable. In general, pressures from about 2 to about 40 p.s.i.g. have been found to be particularly suitable.

The precise time of treatment with microwave energy according to the present invention may depend somewhat upon the particular blood being treated. It has been found that the exposure time, in any case, should be at least about 10 seconds. It has also been found that overexposure results in rupturing of the cell wall membrane causing hemolysis. Since this is undesirable, the total exposure time will be short of that producing significant rupturing, for example rupturing of about 5% of the cells. Since this time will differ with differing samples of blood, it may be necessary to run a preliminary test or tests to note the extent to which the particular red blood cells undergoing treatment can be subjected to the microwave energy without developing significant hemolysis. Another quantitative measure of exposure time is the internal temperature of the mass of blood cells being treated. The temperature reached should not exceed about 110° F., and preferably should not exceed about 105° F.

For example, with a 1 kw. magnetron delivering microwave energy of 2450 megacycles and treating 450–500 ml. volume of blood, it has been found that the total exposure time should not exceed about 75 seconds. When subjected to a single exposure, the duration thereof should be no longer than about 45 seconds, and a single exposure of from about 25 to about 35 seconds has been found to be particularly suitable. The optimum length of total exposure may depend upon the initial temperature of the blood. For example, when the red blood cells are initially at about room temperature, the duration of the single exposure is preferably from about 25 to about 35 seconds; whereas, when the red blood cells are initially at a temperature below about 15° C., the duration of the single exposure is preferably from about 35 to about 45 seconds. When the red blood cells are subjected to a plurality of exposures to the microwave energy, no single exposure should last longer than about 40 seconds. Preferably, when a plurality of exposures is employed, only two or three such exposures are employed, each having a duration from about 10 to about 30 seconds the total exposure time, as stated, not exceeding about 75 seconds. The foregoing exposure times, as stated, are based on the treatment of 450–500 ml. volume of blood with a 1 kw. magnetron delivering microwave energy at about 2450 megacycles, and it will be understood that with other magnitudes of power, volume of material being treated and/or frequencies corresponding adjustments in time will be made for equivalent results.

After exposure to the microwave energy for the required period of time, the source of microwave energy is turned off, and the red blood cells may be removed from the treating zone. It is preferred, however, to continue the cooling effect of the coolant gas after exposure to the microwave energy has been discontinued in order to cool or chill the treated red blood cells, preferably at least down to room temperature. This can be accomplished by leaving the container of red blood cells in the treating zone, through which is circulated the coolant gas, after the source of microwave energy has been turned off, or, in the case of continuous flow in a tube or tubes, by extending the flow beyond the field of direct microwave exposure in or beyond the treating zone while continuing the flow of coolant gas in contact with the tube walls.

The following examples and data are given for the purpose of illustration and are not intended to limit the scope of the invention in any way.

Example 1

In this example, fresh, whole human blood is treated to inhibit morphological changes in the red blood cells thereof upon storage.

A 10 cc. sample of the blood is placed in a glass hospital blood collection tube which is then stoppered. The sample is subjected to a single exposure of microwave energy for 30 seconds. Treatment takes place in a pressure chamber equipped with a 1 kw. magnetron connected to a 220 volt source of alternating current and delivering microwave energy into the chamber at about 2450 megacycles at a wave length of about 4.8 inches. Refrigerated nitrogen gas, at a pressure of 3.5 p.s.i.g., is flowed into, through and out of the chamber, its inlet temperature being about 40° F. and its exit temperature being 70–75° F. After the stated exposure, the blood sample was left in the chamber, with the chilled nitrogen circulating, until cooled back to about 70° F.

The sample, after treatment, is stored for 15 days at room temperature, and then examined microscopically. The treated sample shows two distinct layers, the top layer being clear and straw-colored and the lower layer being red cells. The red cells exhibit excellent morphology being smooth and round and uniform in size and shape, and showing no crenation, pleocytosis or hemolysis.

The American Association of Blood Banks rejects blood for storage if it has stood at room temperature for two hours, and hemolysis is expected to occur in almost all blood cells after standing 24 hours at room temperature.

Example 2

This example illustrates the effects of treating whole human blood which is badly crenated, and also illustrates the cumulative effect of multiple exposures. The blood, in a standard 450 ml. blood bank type plastic container, has been stored, under refrigeration at 4° C., for 17 days from the day it was obtained from the donor. A Wright stained smear of a 0.5 ml. sample, withdrawn from the plastic container using a sterile 24-gauge needle and syringe (followed by sealing the puncture) shows, under a microscope, crenation and pleocytosis of all the red cells, but the cell walls are intact.

The blood in the plastic container is subjected to microwave energy, as in Example 1, under a circulating atmosphere of nitrogen gas at a pressure of 5 p.s.i., gauge, an inlet temperature of about 48° F. and an outlet temperature of 75-80° F. After each exposure, the container is left in the chamber, with the chilled nitrogen gas circulating, until cooled back to about 70° F.

The first such exposure is for 20 seconds, after which a Wright stained smear of a sample is examined microscopically. This shows that about 60% of the cells are smooth and substantially uniform in size and shape evidencing marked reduction in crenation and pleocytosis.

The blood is then exposed to the microwave energy for an additional 25 seconds under the same conditions. Microscopic examination of a withdrawn sample shows that about 90% of the red cells are now smooth and substantially uniform in size and shape.

The blood is next exposed to the microwave energy for a further 30 seconds under the same conditions. Microscopic examination of a withdrawn sample shows that all of the red cells are now smooth and substantially uniform in size and shape and exhibit no crenation, pleocytosis or hemolysis.

The finally treated blood is stored, at 4° C., for 51 days after treatment after which microscopic examination shows no change, all of the red cells having excellent morphology and the appearance of red cells in fresh, whole blood.

Example 3

This example illustrates the beneficial effects of the present process and its lack of deleterious changes in the biochemistry of the serum surrounding the treated red cells in whole blood.

The blood (whole, human), in two standard 450 ml. blood bank type plastic containers, has been stored, under refrigeration at 4° C., for 17 days from the date it was obtained from the donor. Each container also contained the usual ACD anticoagulant (anticoagulant citrate dextrose, U.S.P. Formula A). A Wright stained smear of small withdrawn samples shows, under a microscope, much crenation and pleocytosis of the red cells but no hemolysis. Samples from each of the containers were also subjected to biochemical analyses and the results thereof are set forth in the following Table II below "Control A" and "Control B," respectively.

The blood, in one of the plastic containers (A) is subjected to microwave energy, as in Example 1 except that a 2 kw. magnetron is employed, under a circulating atmosphere of nitrogen gas under a pressure of 5 p.s.i. gauge, an inlet temperature of 48° F. and an outlet temperature of 75-80° F. The blood is subjected to two exposures of microwave radiation, the first lasting 25 seconds and the second lasting 20 seconds. After each exposure, the container is left in the chamber, with the chilled nitrogen circulating, until cooled back to about 70° F. A Wright smear of a sample of the blood after the 25 second treatment shows, under a microscope, that the proportion of crenated red cells was much reduced, the majority of the red cells appeared round and the walls thereof appeared smooth. A sample of the blood after the additional 20 second treatment showed further improvement. A sample of the blood, after the additional 20 second treatment, was subjected to biochemical analysis and the results are set forth in Table II below "Treated A."

The blood in the other container (B) is subjected to microwave energy with circulating nitrogen gas as above, except that it was subjected to a single exposure lasting 40 seconds. This treatment also caused the red cells to lose their crenation and to achieve a round appearance. The results of biochemical analysis of this treated blood are set forth in Table II below "Treated B."

It should be noted that the stored blood used in this example contains an anticoagulant and the biochemistry values thereof cannot be compared to the normal values of circulating human blood.

TABLE I

| | Control A | Treated A | Control B | Treated B |
|---|---|---|---|---|
| Sodium, meq./liter | 156.5 | 155 | 156.5 | 156.2 |
| Chlorides, meq./liter | 75 | 72.5 | 69 | 71 |
| Carbon dioxide, meq./liter | 16.5 | 9.8 | 9.9 | 9 |
| Total protein, gm./100 ml | 6.8 | 6.8 | 6.15 | 6.05 |
| Albumen, gm./100 ml | 3.15 | 3.7 | 2.8 | 2.95 |
| Calcium, mg./100 ml | 9.1 | 8.35 | 8.6 | 8.55 |
| Alkaline phosphatase, K.A.U. | 7.0 | 8.0 | 5.8 | 5.9 |
| Blood urea nitrogen, mg./100 ml | 12.5 | 12 | 12 | 13 |
| Glucose, mg./100 ml | 262 | 256 | 272 | 277 |
| Transaminase, K.U. | 36 | 38 | 30 | 34 |

Comparison of the data of each treated blood with its respective control shows no significant disruption of the biochemistry thereof through treatment by the present process. It should be noted that as this blood contained an anticoagulant, the values thereof are not always within the ranges for normal values.

Example 4

Further to illustrate the lack of deleterious effects on blood, whole human blood serum (350 ml. in 500 ml. stoppered glass bottles) is subjected to microwave energy as in example 3, in a circulating atmosphere of chilled nitrogen gas under a pressure of about 3 p.s.i.g., an inlet temperature of about 40° F. and an outlet temperature of about 65° F. The time of exposure for one set (A) was 15 seconds, and for another set (B) was 15 seconds followed by a second exposure of 15 seconds for a total of 30 seconds. After each exposure the bottles were left in the chamber with the circulating nitrogen until cooled back to about 70° F. Specimens were then removed from the treated samples as well as from a control sample, for bioassay. The results are set forth below and compared with normal values:

TABLE II

| Test | Normal Values | Control | Treated A | Treated B |
|---|---|---|---|---|
| Sodium (meq./l) | 135-145 | 142 | 142.5 | 142.1 |
| Potassium (meq./l) | 3.5-5.0 | 4.1 | 4.0 | 4.0 |
| Alkaline phosphatase (K.A.U.) | 4.0-18 | 7 | 7 | 7 |
| $CO_2$ (meq./l) | 24-32 | 26.5 | 26 | 26 |
| Blood urea nitrogen (mg./100 ml.) | 10-20 | 13.0 | 13.1 | 13.0 |
| Transaminase (K.U.) | 15-45 | 34 | 33 | 33 |
| Calcium (mg./100 ml.) | 9-11.5 | 9.5 | 9.3 | 9.4 |
| Sugar (mg./100 ml.) | 65-110 | 85 | 85 | 82 |
| Bilirubin (mg./100 ml.) | 0.2-1.0 | 0.7 | 0.7 | 0.7 |
| Chlorides (meq./l) | 95-105 | 101 | 100 | 100.5 |
| Protein, total (g./100 ml.) | 6-8 | 7.2 | 7.1 | 7.1 |
| Albumin (g./100 ml.) | 3.5-5.0 | 4.2 | 4.2 | 4.15 |
| Phosphorus (mg./100 ml.) | 3-5 | 2.84 | 2.95 | 2.84 |
| Uric Acid (mg./100 ml.) | 4-7 | 6.25 | 6.05 | 6.05 |

The treated samples also showed normal electrophoresis.

What is claimed is:

1. The method of improving the morphological properties of red blood cells which comprises subjecting the red blood cells in a treating zone, while contained in a confined zone within said treating zone at least one wall of which confined zone is permeable to microwave energy, to microwave energy through a moving atmosphere of coolant gas under superatmospheric pressure, for at least 10 seconds but short of the time where significant rupture of the cells occurs, said moving atmosphere being in direct contact with walls of said confined zone but out of direct contact with said red blood cells and being at a temperature below about 60° F. upon its admission to said treating zone.

2. The method of claim 1 wherein said confined zone is a sealed container holding said red blood cells.

3. The method of claim 1 wherein said confined zone is a confined pathway through which said red blood cells are flowed while being subjected to said microwave energy.

4. The method of claim 1 wherein said microwave energy has a frequency of from about 1000 to about 5000 megacycles per second.

5. The method of claim 4 wherein said microwave energy has a frequency of from about 2000 to about 3000 megacycles per second.

6. The method of claim 5 wherein said microwave energy has a frequency of from about 2400 to about 2500 megacycles per second.

7. The method of claim 1 wherein after exposure to the microwave energy the red blood cells in the confined zone are continued to be subjected to the action of said coolant gas.

8. The method of claim 4 wherein after exposure to the microwave energy the red blood cells in the confined zone are continued to be subjected to the action of said coolant gas.

9. The method of claim 1 wherein the temperature of said red blood cells does not exceed about 110° F.

10. The method of claim 9 wherein the temperature of said red blood cells does not exceed about 105° F.

11. The method of claim 1 wherein the temperature of said red blood cells does not exceed about 110° F., and wherein after exposure to said microwave energy the red blood cells are continued to be subjected to the action of said coolant gas.

12. The method of claim 11 wherein said microwave energy has a frequency between about 1000 and about 5000 megacycles per second.

13. The method of claim 12 wherein said microwave energy has a frequency between about 2000 and about 3000 megacycles per second.

14. The method of claim 13 wherein said microwave energy has a frequency between about 2400 and about 2500 megacycles per second.

References Cited

UNITED STATES PATENTS

| 2,169,081 | 8/1939 | James | 62—78 |
| 2,315,285 | 3/1943 | Demington | 62—78 |
| 2,480,954 | 9/1949 | Palmer | 62—264 |
| 3,070,976 | 1/1963 | Guhl | 62—78 |

WILLIAM J. WYE, *Primary Examiner.*

U.S. Cl. X.R.

34—4; 62—264